March 29, 1966  H. CLARK  3,243,631
SPARK-CATALYTIC IGNITOR
Filed Jan. 16, 1964
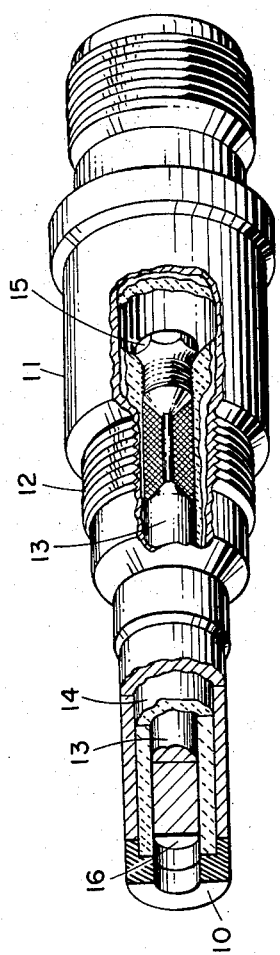
HERBERT CLARK
INVENTOR.
BY *Glenn H. Antrim*
AGENT United States Patent Office 3,243,631
Patented Mar. 29, 1966

3,243,631
SPARK-CATALYTIC IGNITOR
Herbert Clark, Dallas, Tex., assignor to Ling-Temco-Vought, Inc., Dallas Tex., a corporation of Delaware
Filed Jan. 16, 1964, Ser. No. 338,241
2 Claims. (Cl. 313—141)

This invention relates to ignitors for use in equipment for burning ducted fuel-air mixtures propelled at high velocities and particularly for use in gas turbines.

Since undesirable fluid flow transients in a gas turbine engine may often disturb the ratio of fuel to air, especially during high-altitude operation, the flame of the engine is likely to blow out at any time during its operation. In order to regain thrust immediately, the fuel, as soon as the correct mixture is available, must be instantly ignited again. Continuous high-energy spark ignition systems are unsatisfactory because of the excessive erosion of the spark gap electrodes. Low-energy spark ignition systems that provide continuous spark do not provide effective ignition.

An object of the present invention is to combine a catalytic ignitor with a spark ignitor to provide a simple, dependable, continuous source of ignition.

A feature of the invention is the utilization of a catalytic ignitor as an electrode of the spark ignitor.

Other objects and advantages will be apparent from the specification and claims and from the accompanying drawing that shows, in partial section, an ignitor according to this invention.

The ignitor as illustrated is a typical spark-type ignitor to which has been added a catalytic platinum tip 10. The tip 10 extends directly into the path of the ignited fuel-air mixture within a combustion chamber so that it is heated to incandescence. During momentary blowout of the flame that results from a short interruption of supply of combustible fuel-air mixture, the platinum tip 10 through its retained heat and catalytic action causes ignition again of the combustible fuel-air mixture, as it becomes quickly available within the combustion chamber.

An outer electrode 11 is a usual cylindrical steel shell that has a threaded portion 12 for installing the ignitor in an engine such that the platinum tip 10 and its associated spark gap 16 are positioned within the combustion chamber. An inner electrode 13 is positioned coaxially within the outer electrode 11 by a usual ceramic insulator 14 that prevents high-voltage arcing between the electrodes except at the spark gap at one end of the electrode. The other end of the inner electrode 13 is connected to a connector 15. The connector 15 and the shell 11 are to be connected to a high-energy ignition system in the usual manner.

The firing end portion of a preferred ignitor is according to a "constrained" design in which the spark gap 16 is within a small cavity that is formed by an outer electrode extending around and beyond the end of the inner electrode 13. According to the present invention, the extended portion of the outer electrode is the cylindrical platinum tip 10 that is connected by welding or other attaching means to the end of the outer electrode 11. The adjacent end of the insulator 14 extends beyond the end of the inner electrode 13 a distance that provides the desired length of the spark gap that is between the end of the inner electrode and that portion of the inner surface of the platinum tip 10 that extends beyond the end of the insulator 14. The platinum tip 10 in a preferred embodiment, as shown, has an off-set inner cyilndrical surface that conforms to the end of the insulator 14 so that the end surface of the insulator as well as its outer surface that is near its end is shielded from the most intense heat of the flame within the combustion chamber. Obviously, the inner electrode 13 is also quite well shielded from the intense heat.

Shortly after high voltage has been applied to provide spark between the platinum tip 10 and the inner electrode 13 and a fuel-air mixture within a combustion chamber has thereby been ignited, the platinum tip 16 is heated to incandescence. A momentary loss of flame does not necessitate the reapplication of ignition voltage to the ignitor because as the combustion chamber is quickly replenished with a correct mixture of fuel, the hot platinum tip by its catalystic action again ignites the fuel. Particularly, through the use of the catalytic tip 10 the operation of an engine has been extended to much higher altitudes than obtained formerly when only initial starting ignition is supplied. The combination of a platinum tip on a spark ignitor provides an effective, inexpensive device for providing continuous ignition.

The use of platinum as the material of the catalytic tip 10 is preferred because it resists high temperature. The platinum is more effective as a catalyst if it is porous, but is less subject to erosion by the flame front if it is solid. Nickel as a catalyst would obviously have a much shorter life than platinum.

While only one embodiment of the invention has been described in detail herein and shown in the accompanying drawing, it will be evident that various modifications are possible in the arrangement and construction of its components without departing from the scope of the invention.

I claim:
1. A combination spark ignitor and catalytic ignitor comprising:
    an inner conductive electrode,
    an outer conductive electrode having an inner surface,
    a hollow insulator, the inner surface of said outer electrode being separated from the outer surface of said inner electrode by said insulator,
    a hollow catalytic tip that withstands high temperatures joined to one end of the outer electrode, said tip being adapted to extend into the flame area of a combustion chamber and to extend beyond said insulator and said inner electrode to function as a heat shield, thereby to protect said insulator and said inner electrode from high temperature of flame, a portion of the inner surface of said catalytic tip that extends beyond the inner surface of said insulator being flush with the inner surface of the hollow insulator and spaced apart from said inner electrode the distance of a desirable spark gap,
    said catalytic tip when extended into a combustion chamber being heated by combustion to become effective to ignite a gas fuel mixture to maintain combustion in spite of transient disturbances after initial ignition has been supplied by application of ignition voltage between said electrodes.
2. A combination spark ignitor and catalytic ignitor comprising:
    an inner conductive electrode,
    an outer cylindrical conductive electrode, a hollow insulator, the inner surface of said outer electrode being separated from the outer surface of said inner electrode by said insulator, said insulator extending beyond one end of said inner electrode approximately the distance of the spark gap desired between said electrodes, a hollow catalytic tip containing platinum joined to that end of said outer electrode that is adjacent said one end of said inner electrode, said catalytic tip extending over said extended end of said insulator and having an inner surface flush with the inner surface of the insulator to form a spark gap between said one end of said inner electrode and the inner surface of the catalytic tip that is flush with the inner surface of the insulator, said catalytic tip when extended into a combustion chamber being heated by combustion to become effective to ignite a gas-fuel mixture to maintain combustion in spite of transient disturbances after initial ignition has been supplied by application of ignition voltage between said electrodes.

References Cited by the Examiner

UNITED STATES PATENTS

| | | | |
|---|---|---|---|
| 2,356,053 | 8/1944 | Hostings | 313—131 X |
| 2,391,456 | 12/1945 | Hensel | 313—11.5 |
| 2,790,104 | 4/1957 | Smits | 313—118 X |
| 2,870,376 | 1/1959 | Tognola | 313—131 X |

GEORGE N. WESTBY, *Primary Examiner.*
ROBERT SEGAL, *Examiner.*
S. D. SCHLOSSER, *Assistant Examiner.*